Aug. 22, 1939.  H. STEUDEL  2,170,039
BEARING AND METHOD OF MAKING SAME
Filed Jan. 5, 1939
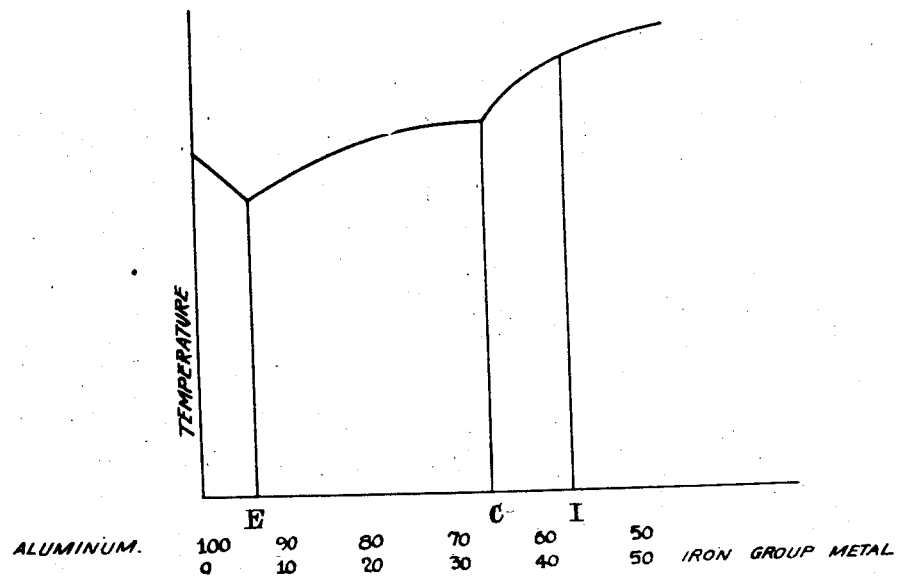
Inventor
Hans Steudel,
By Bailey & Carson
Attorneys Patented Aug. 22, 1939

2,170,039

UNITED STATES PATENT OFFICE 2,170,039

BEARING AND METHOD OF MAKING SAME

Hans Steudel, Dessau, Germany, assignor to Junkers Flugzeug-und-Motorenwerke Aktiengesellschaft, a corporation of Germany Application January 5, 1939, Serial No. 249,534
In Germany April 16, 1934

11 Claims. (Cl. 29—149.5)

This application is a continuation-in-part of my preceding application Serial No. 105,446, filed October 13, 1936, which in turn is a division of my application Serial No. 13,434, filed March 28, 1935.

My invention relates to bearings, and particularly to bearings for shafts employed in engines, as well as to a method of making such bearings.

In the development of engines, and particularly of airplane engines, it has been found that the usual white metal or lead bronze bearings have not been satisfactory. As the power of the engines has increased with respect to their weight, the bearings have been subjected to higher temperatures and pressures than in the past, and at such temperatures and pressures the known bearing metals are inadequate.

The primary object of the present invention is to provide a bearing which is capable of withstanding the higher temperatures and pressures to which shaft bearings are now subjected, this bearing being formed of a novel composition which renders it superior to other bearings for this use.

According to the invention, the basic material of which the bearings are formed is an aluminum alloy. Various types of aluminum base alloys were tested by me in an effort to produce a bearing capable of withstanding high temperatures and pressures. It was found, however, that such alloys had a tendency to seize the shaft, and were therefore unsatisfactory.

Particularly, tests were made of alloys having aluminum as a base with the metals chromium, manganese, iron, cobalt and nickel, that is, the metals having the numbers from 24 to 28 in the periodic system. These are the metals of the 6th, 7th and 8th groups of the 4th series of the periodic system. More especially, the metals of the iron group, namely iron, cobalt and nickel were tried.

It was first found that the hypereutectic alloys of aluminum as a base with the above metals were unsatisfactory as bearing metals. Examination of the microstructure of these compositions disclosed that they were composed of crystals of a intermetallic compound of aluminum and the addition metal within a ground mass formed of an eutectic alloy and such intermetallic compound. The intermetallic crystals were in the form of long thin needles or plate like structures which were brittle and were not strongly held within the eutectic ground mass. When efforts were made to cut the surfaces of these compositions to provide a bearing surface, some of the needle-like crystals were torn out and others were loosened. Any attempt to use such material as a bearing resulted unsatisfactorily, since, in cutting the material, many of the intermetallic crystals, which form the effective bearing surfaces, were torn out, leaving holes in the bearing surface; and since the others which were loosened would come loose and score the shaft. For that reason such alloys did not appear to be useful for bearings.

I have found, however, that bearings may be formed of such hypereutectic compositions provided the crystals of the intermetallic compound are first caused to assume a smaller more rounded form, and to become more firmly embedded in the ground mass. I have found that this result can be obtained by kneading (that is, forging, pressing, rolling or hammering) or working the hypereutectic composition.

I have found that a bearing produced from the material so modified has many advantages. It allows an oil film to be formed in such a manner that the shaft is principally supported on the oil film itself and during operation hardly comes into actual contact with the bearing at all. This results in reduced wear and a considerable reduction in the coefficient of friction. The hard intermetallic crystals actually are effective only when the shaft starts or stops, or in the periods when semi-liquid or even dry friction occurs.

The eutectic ground mass of the bearing is composed of two or more different species of crystals in very fine form. To this the oil molecules may firmly adhere so that a stable oil film is formed. The shape and firm adherence of the crystals makes it possible to cut or scrape the bearing surface to the proper fit, since the crystals are not torn out or loosened but are cut through cleanly and provide good bearing surfaces.

The accompanying drawing shows a typical phase diagram of an aluminum base alloy with one of the addition metals named above. It will be noted that, starting at 100% aluminum at the left side of the figure, the phase or liquidus curve first drops, to the point E. The phase curve then rises to a point C, at which point there is a break in the curve. Thereafter the curve continues to rise through the point I.

The point E represents the eutectic point, that is the composition of the true alloy. The point C represents the break in the liquidus curve. The point I represents the composition of the intermetallic compound between aluminum and the addition metal.

At the point I, the composition is composed substantially entirely of the intermetallic compound. At the point E there is a eutectic alloy of aluminum and the intermetallic compound, in the form of fine crystals of each. Between points E and I the composition is hypereutectic, that is, it contains crystals of the intermetallic compound in a ground mass of the eutectic composition E.

According to the invention, the composition of which my bearing is formed must lie between the eutectic point E and the intermetallic compound I. Preferably, the composition lies between the eutectic point E and the break in the liquidus curve C. Within all points of the broader range the hypereutectic nature of the composition may be easily determined by microscopic examination through the presence in the eutectic ground mass of the crystals of the intermetallic compound.

The following are examples of compositions, hypereutectic in nature, which embody the invention and which after kneading are suitable for use as bearing metals.

Example 1—8% nickel, 92% aluminum;
Example 2—8% cobalt, 92% aluminum;
Example 3—5% chromium, 95% aluminum;
Example 4—5% iron, 95% aluminum;
Example 5—6.5% iron, 93.5% aluminum.

It is further possible within the scope of the invention to improve the bearing material for certain purposes by the addition thereto of a small amount of a hardening component. This hardener may be any metal which forms a mixed crystal or solid solution with the eutectic ground mass. Examples of such a metal are magnesium, copper and zinc. The hardening metal preferably is present in an amount not exceeding 1%. The following are examples of alloys in which such hardening metals are used:

Example 6—8% nickel, 0.5% copper, 91.5% aluminum;
Example 7—8% nickel, 1% copper, 91% aluminum;
Example 8—8% cobalt, 1% zinc, 91% aluminum;
Example 9—5% iron, 0.5% magnesium, 94.5% aluminum.

It is not necessary that only one of the metals of the above group be used, or that any one of the metals should be present in an amount exceeding the eutectic percentage for that particular metal, as long as the whole composition is hypereutectic, or, in other words, contains crystals of an intermetallic compound of aluminum with one of the other metals within a eutectic ground mass. The following are examples of compositions containing more than one of the addition meals, which after kneading are satisfactory for use as bearings:

Example 10—2% iron, 3% nickel, 1.5% cobalt, 93.5% aluminum;
Example 11—2% iron, 1% manganese, 1% chromium, 1% nickel, 95% aluminum;
Example 12—2% iron, 1% manganese, 1% chromium, 1% molybdenum, 95% aluminum;
Example 13—3% iron, 4% nickel, 93% aluminum;
Example 14—2% iron, 3% nickel, 1.5% cobalt, 0.5% copper, 93% aluminum.

Each of the above alloys must of course be subjected to a kneading treatment in order to render it useful to produce a bearing according to the invention. The alloys are produced merely by melting the ingredients together and then kneading the resulting composition.

The term "aluminum" as used in the present specification and claims is intended to include not only pure aluminum but also a metal containing the impurities of commercial aluminum or small amounts of other impurities.

While I have described herein some embodiments of my invention, I wish it to be understood that I do not intend to limit myself thereby except within the scope of the appended claims.

I claim:

1. A bearing composed of a kneaded material comprising essentially aluminum as a base and at least one addition metal of the 6th, 7th, and 8th groups of the 4th series of the periodic system, said composition being hypereutectic and cmoposed of crystals of an intermetallic compound of aluminum and one of said addition metals having a somewhat rounded form distributed in a matrix of a softer eutectic ground mass and firmly adhering thereto.

2. A bearing composed of a kneaded material comprising essentially aluminum as a base and an addition metal of the 6th, 7th, and 8th groups of the 4th series of the periodic system, the relative proportions of said aluminum and said addition metal lying between the eutectic point and the first break in the liquidus curve on the phase diagram, said composition being hypereutectic and composed of crystals of an intermetallic compound of aluminum and said addition metal having a somewhat rounded form distributed in a matrix of a softer eutectic ground mass and firmly adhering thereto.

3. A bearing composed of a kneaded material comprising essentially aluminum as a base and at least one metal of the iron group, said composition being hypereutectic and composed of crystals of an intermetallic compound of aluminum and an iron group metal having a somewhat rounded form distributed in a matrix of a softer eutectic ground mass and firmly adhering thereto.

4. A bearing composed of a kneaded material comprising essentially aluminum as a base and iron, said composition being hypereutectic and composed of crystals of an intermetallic compound of aluminum and iron having a somewhat rounded form distributed in a matrix of a softer eutectic ground mass and firmly adhering thereto.

5. A bearing composed of kneaded material comprising essentially aluminum as a base, at least one metal of the 6th, 7th and 8th groups of the 4th series of the periodic system, and a metal which forms a solid solution with the eutectic of aluminum and such addition metal in an amount not exceeding 1%, said composition being hypereutectic and composed of crystals of an intermetallic compound of aluminum and one of said addition metals having a somewhat rounded form distributed in a matrix of a softer eutectic ground mass and firmly adhering thereto.

6. A bearing composed of a kneaded material comprising essentially aluminum as a base, a metal of the 6th, 7th and 8th groups of the 4th series of the periodic system, the relative proportions of said aluminum and said addition metal lying between the eutectic point and the first break in the liquidus curve on the phase diagram, and a metal which forms a solid solution with the eutectic of aluminum and such addition metal in an amount not exceeding 1%, said composition being hypereutectic and composed of crystals of an intermetallic compound of aluminum and said addition metal having a somewhat rounded form distributed in a matrix of a softer eutectic ground mass and firmly adhering thereto.

7. A bearing composed of a kneaded material comprising essentially aluminum as a base, at least one metal of the iron group and copper in an amount not exceeding 1%, said composition being hypereutectic and composed of crystals of an intermetallic compound of aluminum and an iron group metal having a somewhat rounded form distributed in a matrix of a softer eutectic ground mass and firmly adhering thereto.

8. In a process of producing a bearing, the step of kneading a material comprising essentially aluminum as a base and at least one addition metal selected from the metals of the 6th, 7th and 8th groups of the 4th series of the periodic system, said composition being hypereutectic and composed of crystals of an intermetallic compound of aluminum and an addition metal distributed in a matrix of a softer eutectic ground mass, to cause said crystals to assume a smaller more rounded form and to adhere firmly to said ground mass.

9. In a process of producing a bearing, the step of kneading a material comprising essentially aluminum as a base and at least one metal of the iron group, said composition being hypereutectic and composed of crystals of an intermetallic compound of aluminum and an iron group metal distributed in a matrix of a softer eutectic ground mass, to cause said crystals to assume a smaller, more rounded form and to adhere firmly to said ground mass.

10. In a process of producing a bearing, the step of kneading a material comprising essentially aluminum as a base, at least one addition metal selected from the metals of the 6th, 7th and 8th groups of the 4th series of the periodic system, and a hardening metal which forms a solid solution with the eutectic of aluminum and such addition metal in an amount not exceeding 1%, said composition being hypereutectic and composed of crystals of an intermetallic compound of aluminum and an addition metal distributed in a matrix of a softer eutectic ground mass, to cause said crystals to assume a smaller more rounded form and to adhere firmly to said ground mass.

11. In a process of producing a bearing, the step of kneading a material comprising essentially aluminum as a base, at least one metal of the iron group, and copper in an amount not exceeding 1%, said composition being hypereutectic and composed of crystals of an intermetallic compound of aluminum and an iron group metal distributed in a matrix of a softer eutectic ground mass, to cause said crystals to assume a smaller, more rounded form and to adhere firmly to said ground mass.

HANS STEUDEL.